Dec. 26, 1961 E. J. GIBBONS 3,014,233
SCOURING PADS AND METHOD AND APPARATUS FOR MAKING THEM
Filed Aug. 6, 1958 2 Sheets-Sheet 1
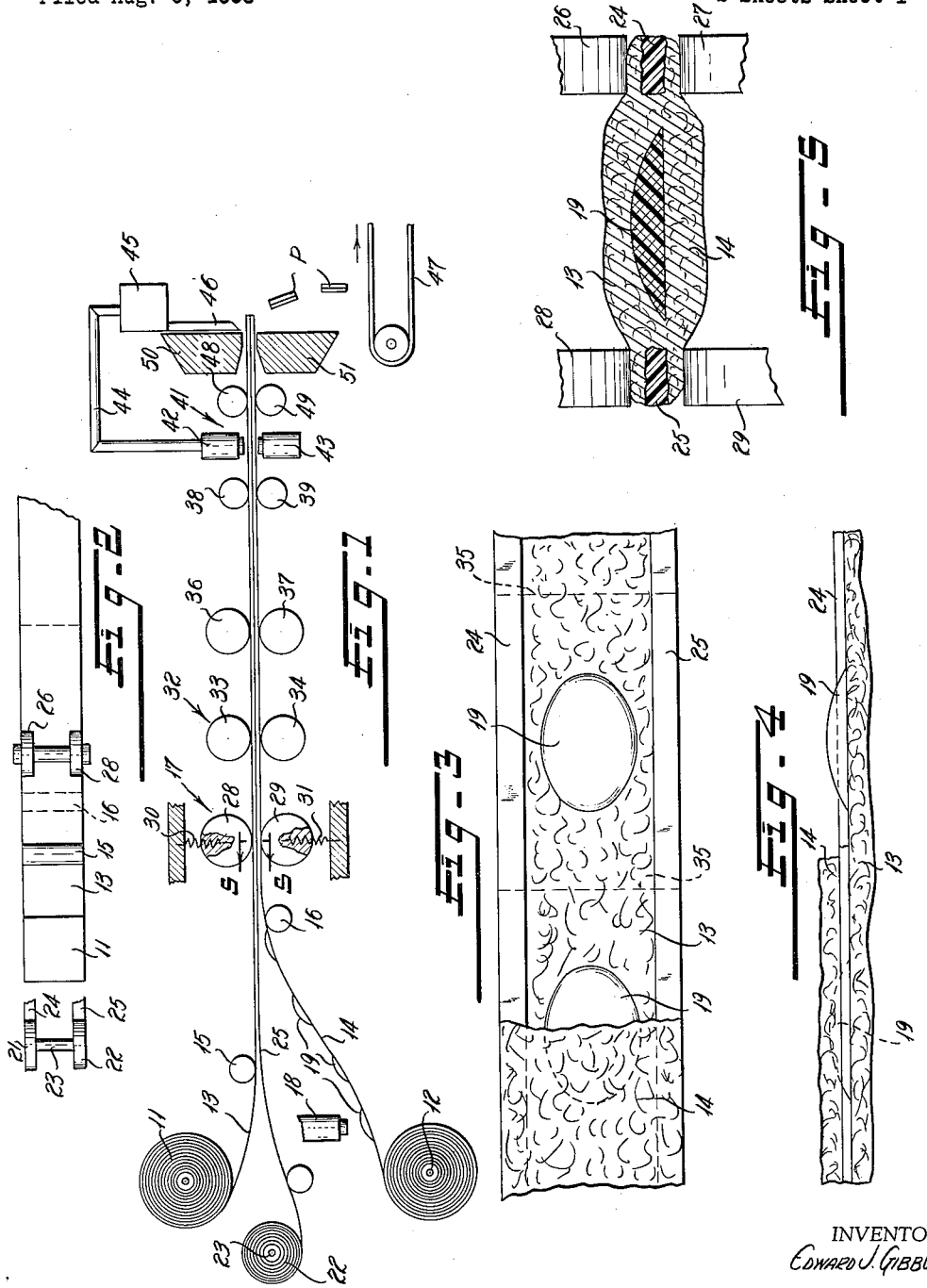
INVENTOR
Edward J. Gibbons
BY Strauch, Nolan & Neale
ATTORNEYS

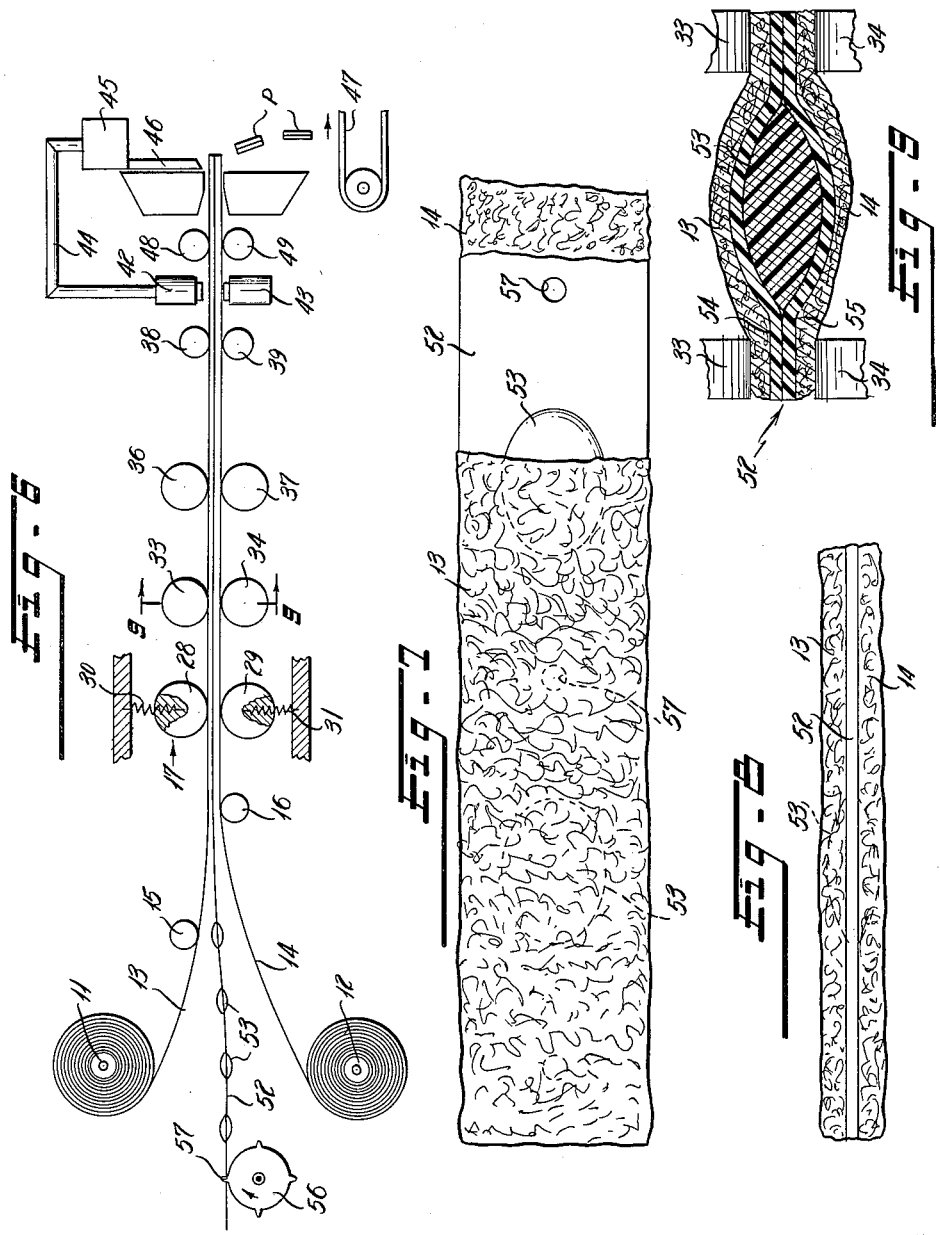

United States Patent Office 3,014,233
Patented Dec. 26, 1961

3,014,233
SCOURING PADS AND METHOD AND
APPARATUS FOR MAKING THEM
Edward J. Gibbons, Jamaica, N.Y., assignor to Colgate-Palmolive Company, New York, N.Y., a corporation of Delaware
Filed Aug. 6, 1958, Ser. No. 753,573
12 Claims. (Cl. 15—568)

This invention relates to scouring pads and apparatus and methods for making them and is particularly directed to scouring pads wherein bodies of cleaning material are incorporated within layers of matted metal fibres or strands having tightly bonded edge areas.

It has been proposed to incorporate soap or like material into steel wool pads and to form the pads in a continuous operation wherein ribbons of steel wool are saturated in soapy liquid and then cut into pads of desired size. The pads so produced are sticky and difficult to handle and package, and the invention overcomes this objectionable feature. Moreover the apparatus for applying the fluid soap and drying it in the wool is rather complex and expensive, and the invention provides a much less costly and simpler apparatus to produce a superior product.

It is the major object of the invention to provide a novel dry scouring pad containing an incorporated discrete body of a cleaning material such as soap or detergent, and novel apparatus and process for making the pad.

A further object of the invention is to provide a novel scouring pad wherein a capsule of cleaning material such as soap or detergent in liquid, paste or solid form is incorporated within a springy mass of metal fibers, and novel apparatus and method for making the pad.

A further object of the invention is to provide a novel scouring pad wherein at least one discrete body of cleaning material is incorporated between two layers of metal fibres bonded along opposite edge areas.

It is a further object of the invention to provide a novel process and apparatus for making a scouring pad wherein a body of cleaning material is incorporated between two layers of metal fibres and opposite edge areas of the layers are bonded by thermoplastic material subjected to heat and pressure.

A further object of the invention is to provide a novel continuous process and apparatus for making scouring pads wherein spaced bodies of cleaning material are introduced between superposed strips of matted metal fibres, at least the opposite edge areas of the strips are thermoplastically bonded, and the composite strip cut into pads of desired size. Pursuant to this object the bodies of cleaning material may be deposited on one of the strips or incorporated in a continuous tape fed between the strips.

It is another object of the invention to provide a novel apparatus for the continuous production of scouring pads wherein a continuous composite strip of matted metal fibres containing uniformly spaced bodies of cleaning material within it triggers an automatic cutter for severing the strip into pads of desired size.

Further objects of the invention will presently appear as the description proceeds in connection with the annexed claims and the appended drawings wherein:

FIGURE 1 is a diagrammatic view partially sectioned and showing apparatus and process of manufacturing scouring pads according to a preferred embodiment of the invention;

FIGURE 2 is a fragmentary top plan view showing the bonding tape reels;

FIGURE 3 is an enlarged plan view of composite strip material showing its bonded structure;

FIGURE 4 is an end elevation of the composite strip of FIGURE 2;

FIGURE 5 is a section substantially on line 5—5 of FIGURE 1 showing the composition of the strip during manufacture;

FIGURE 6 is a diagrammatic view like FIGURE 1 but showing another embodiment of the apparatus;

FIGURE 7 is an enlarged plan view of the composite strip in FIGURE 6;

FIGURE 8 is an end view of the strip of FIGURE 7; and

FIGURE 9 is a section substantially on line 9—9 of FIGURE 6.

Referring to FIGURES 1–5, vertically spaced reels 11 and 12 are mounted one above the other in lateral alignment on parallel axes. These reels have wound thereon flat ribbons or strips 13 and 14 of steel wool which are directed by guide means, such as rollers 15 and 16, toward a compression roll pass 17. The strips of steel wool are preferably of the same size and of uniform cross-section along their respective lengths. The strips are of desired thickness and width to provide a finished scouring pad of desired size. The steel wool strips are springy to tend to maintain fibrous structure.

Strip 14 moves under the end of a nozzle 18 connected to a suitable supply of detergent or like cleansing material and adapted to discharge at uniform intervals metered charges 19 of the detergent onto strip 14. The detergent is fluent, preferably a paste, for discharge and of such consistency that it maintains its general position and shape on strip 14 as indicated, and the frequency of discharge and the linear speed of strip 14 are so correlated that deposited discrete bodies 19 appear on the strip 14 with uniform spacing as it approaches pass 17. As shown in FIGURE 3 the longitudinally spaced deposits 19 are contained well within the side edges of the strip 14, for a purpose to appear.

Two reels 21 and 22 are provided in longitudinal alignment with the edge areas of the strips, these reels preferably being mounted on a common rotatable axle 23. Wound on reels 21 and 22 are narrow bands of bonding tape 24 and 25 respectively which pass over suitable guide means to enter roller pass 17 between the steel wool strips 13 and 14. The widths of tapes 24 and 25 are the same and such, as shown in FIGURE 3, as to lie between outer edge areas along the lengths of steel wool strips 13 and 14 laterally outwardly of deposits 19. For example if strips 13 and 14 are five inches wide, tapes 24 and 25 may each be about one-half inch wide.

Tapes 24 and 25 are preferably composed of some normally solid thermoplastic material which will fuse or soften under heat and pressure and then resolidify. An example of such material is cellulose acetate.

In the invention the steel wool strips 13 and 14 enter the roller pass 17 with the spaced detergent bodies 19 on strip 14 disposed between their central areas and the thermoplastic tapes 24 and 25 disposed between and entirely along their edge areas. All of the strips and tapes are continuously fed into the pass 17 by suitable means (not shown) at the same linear speed.

Pass 17 comprises vertically spaced and laterally aligned pairs of relatively narrow cylindrical pressure rollers 26, 27 and 28, 29 as shown in FIGURE 5. The width of these pressure rollers is preferably about the same as the tapes 24, 25 and the pressure roller pairs are so vertically spaced as to provide restricted throats wherein the edge areas of the relatively compressible steel wool strips are tightly compressed into contact with the thermoplastic tapes between them, essentially as shown in FIGURE 5.

The compression roller pairs 26, 27 and 28, 29 are urged toward each other in the pass as by powerful springs 30 and 31 as indicated in FIGURE 1.

Beyond the compression roll pass 17 is a heat sealing roll pass 32 wherein laterally spaced roller pairs 33 and 34 which are preferably of about the same width as roller pairs 26, 27 and 28, 29 engage the compressed edge areas of the composite strip under considerable pressure. In addition the roller pairs 33, 34 are heated, as by electrical units within them, so that the compressed edge areas all along the composite strip are subjected to combined heat and pressure sufficient to soften the tapes 24 and 25. As a result the temporarily soft material of tapes 24 and 25 will enter the interstices of the adjacent steel wool areas sufficiently to provide a bond between the upper and lower strips 13 and 14 that becomes permanent and increasingly effective as the tape material solidifies after leaving the pass 32. In some installations the functions of the compression roll pass and the heat seal roll pass may be combined in a single similar pressure and heat applying pass.

The composite strip is now complete and ready to be cut into units of desired size for packaging and eventual use. It consists of two coextensive layers of steel wool with uniformly spaced bodies of detergent between them and with their edge areas permanently bonded all along their entire lengths.

Any suitable automatic cutting device for severing the composite strip at equally spaced regions indicated at 35 in FIGURE 3 may be provided, but a preferred form will now be described. Suitable sets of guide rolls at 36, 37 and 38, 39 lead the composite strip into an electronic sensing station 41 which is of such nature that a change in electrical capacitance between the opposed charged elements 42 and 43, such as caused by the passage of body 19, will result in a signal transmitted along cable 44 to cutter control unit 45 and thereby cause a reciprocation of cutter blade 46 to sever the composite strip at regions 35 and thereby produce individual pads P that drop onto a take-away conveyor 47 leading to a packaging station.

The composite strip is fed into the cutting station by guide rolls 48, 49 and blade 46 acts on the strip just beyond the fixed throat 50, 51 where the strip is supported during cutting.

The strips 13 and 14 may of course be of any desired metal wool or like matted strand structure such as copper or aluminum. The bodies 19 may be deposited as disclosed in fluent paste condition, or they may be individual capsules of liquid, paste or solid dispensed from a container at 18. The heat sealing material of tapes 24, 25 may be any suitable thermoplastic which is impervious to water and will not permit separation of the matted strand strips at room temperatures or when hot water is used in scouring. In this respect they are superior to most adhesives. Where a capsule is used as body 19, it is punctured upon first use of the pads P, each of which contains one body 19, and in effect the detergent is slowly dispensed as it is used. While the material of body 19 has been described as detergent it may be any suitable water soluble cleaning material such as soap or the like. In addition where the material is in gelatine or like capsules it may contain volatile oils that are released only when the pad P is actually used. The bond at the side edges of pads P maintains the assembly tight and keeps body 19 in place during the useful life of the pad.

Pads P as produced by the invention are dry and easy to handle, and are not sticky like prior pads which were merely saturated with the cleansing material.

The embodiment of FIGURES 6–9 provides a different manner of introducing the bodies of cleansing material between the steel wool layers 13 and 14. In this embodiment the cleansing material in liquid, paste or solid, including granular, form is incorporated into a wide tape 52 by an operation prior to the composite strip forming and bonding operation.

Essentially tape 52 is of the same material as tapes 24 and 25 and the bodies 53 of cleansing material are encapsulated therein. This may be accomplished by heat sealing together two thin ribbons 54 and 55 with the material 53 enclosed between them at uniform intervals. Alternatively the material may be prepared in separate capsules heat bonded to the surface of a carrier ribbon of heat sealing material. In any event tape 52 carries capsule bodies of cleansing material 53 at uniformly spaced locations and it is unwound from a suitable supply reel (not shown). The tape 52 is substantially continuously advanced into the compression pass 17 by a toothed sprocket wheel 56 engaging holes 57 in the tape.

After tape 52 enters the pass 17 the operations of edge area compression, heat sealing and cutting into pads P are accomplished as in the embodiment of FIGURES 1–5, and the resultant pad product P is essentially the same.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A scouring pad consisting essentially of two layers of matted metal fibres with at least one discrete body of cleaning material enclosed between them and water impervious means bonding opposite interior side areas of said layers, said water impervious means comprising at least one substantially continuous layer of normally solid heat softenable material that remains solid in the presence of hot water interiorly incorporated between the side edge areas of the metal fibre layers and interlocked permanently with the fibres of both layers.

2. A scouring pad consisting essentially of two layers of matted metal fibres with a capsule of cleaning material between them and means positively interlocked with and bonding said layers together comprising at least one body of normally heat softenable material that remains solid in the presence of hot water and extends along the pad between said metal fibre layers in permanently interlocked bond with the fibres of both layers.

3. A scouring pad consisting essentially of two layers of matted metal fibres with a layer of thermoplastic material between them containing a body of cleaning material, said layers of metal fibres being interiorly heat sealed together under pressure.

4. The method of making a scouring pad which comprises the steps of incorporating a discrete body of cleaning material between two layers of matted metal fibres, introducing a layer of normally solid heat softenable bonding material that remains solid in the presence of hot water between coextensive edge areas of said metal fibre layers, and applying sufficient heat and pressure at said edge areas to cause said material layer to permeate and interlock permanently with the fibres of both layers.

5. In a method of making scouring pads, the steps of superposing two continuous strips of matted metal fibres while incorporating longitudinally spaced bodies of cleaning material between the layers, heat sealing opposite sealing edge areas of said strips by introducing heat softenable bonding material between said strips and applying sufficient heat and pressure to bond said strips together by means of said material, and severing the composite strip into individual pads of desired size.

6. In a method of making scouring pads, the steps of superposing two continuous strips of matted metal fibres and at the same time introducing between said strips a series of discrete bodies of cleaning material in predetermined spaced relation and at least one continuous tape of thermoplastic material, and subjecting the composite strip to sufficient heat and pressure to soften said thermoplastic material for bonding said strips together.

7. In the method defined in claim 6, said bodies being deposited on one of said strips prior to superposition.

8. In the method defined in claim 6, said bodies being incorporated in said tape.

9. In a method of making scouring pads, the steps of superposing two continuous strips of matter metal fibres with a series of longitudinally spaced discrete bodies of cleaning material between them, providing heat softenable material between and along said strips, applying sufficient heat and pressure to bond said strips together by means of said material thereby to form a continuous composite strip, and automatically cutting the composite strip into pads of desired size.

10. In the method defined in claim 9, said cutting being controlled by said composite strip.

11. A scouring pad comprising two layers of metal wool with a discrete body of water soluble cleaning material wholly enclosed between them and having opposite interior edge areas bonded by a heat and pressure incorporated strip of thermoplastic material, said material strip being normally solid in the presence of hot water and so permeating into both of said metal wool layers as to provide a permanent interlocking bond therewith.

12. The scouring pad defined in claim 11, wherein said body is enclosed in a liquid tight capsule.

References Cited in the file of this patent

UNITED STATES PATENTS

| | | |
|---|---|---|
| 1,646,395 | Field | Oct. 25, 1927 |
| 1,682,118 | Field | Aug. 28, 1928 |
| 1,682,119 | Field | Aug. 28, 1928 |
| 1,978,169 | Ricketts | Oct. 23, 1934 |
| 1,991,559 | Kingman | Feb. 19, 1935 |
| 2,054,198 | Jones | Sept. 15, 1936 |
| 2,083,871 | Serewicz | June 15, 1937 |
| 2,382,169 | Pena | Aug. 14, 1945 |
| 2,424,103 | Lobley et al. | July 15, 1947 |
| 2,470,851 | Hermanson | May 29, 1949 |
| 2,497,206 | Bruce et al. | Feb. 14, 1950 |
| 2,655,777 | Hagen | Oct. 20, 1953 |
| 2,779,465 | Anderson | Jan. 29, 1957 |

UNITED STATES PATENT OFFICE

CERTIFICATE OF CORRECTION

Patent No. 3,014,233            December 26, 1961

Edward J. Gibbons

It is hereby certified that error appears in the above numbered patent requiring correction and that the said Letters Patent should read as corrected below.

Column 5, line 8, for "matter" read -- matted --.

Signed and sealed this 14th day of August 1962.

(SEAL)
Attest:

ERNEST W. SWIDER            DAVID L. LADD
Attesting Officer            Commissioner of Patents